United States Patent
Bessler

(10) Patent No.: US 6,502,018 B1
(45) Date of Patent: *Dec. 31, 2002

(54) METHOD FOR DIAGNOSIS OF EQUIPMENT

(75) Inventor: Warren Frank Bessler, Amsterdam, NY (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/257,406

(22) Filed: Feb. 25, 1999

(51) Int. Cl.$^7$ ............ G06F 7/00; G06F 17/00; G06F 19/00
(52) U.S. Cl. ............ 701/29; 701/33; 701/34; 701/35; 701/79; 303/146-148
(58) Field of Search ............ 701/29, 33, 34, 701/35, 79; 303/146, 147, 148; 204/401, 400, 194; 324/530; 73/35.01–35.06

(56) References Cited

U.S. PATENT DOCUMENTS

| | | | | |
|---|---|---|---|---|
| 5,731,572 A | * | 3/1998 | Winn | 235/70 R |
| 5,806,011 A | * | 9/1998 | Azzaro et al. | 701/99 |
| 5,915,800 A | * | 6/1999 | Hiwatashi et al. | 303/146 |
| 6,070,952 A | * | 6/2000 | Tozu et al. | 303/146 |
| 6,074,020 A | * | 6/2000 | Takahashi et al. | 303/146 |
| 6,078,858 A | * | 6/2000 | Tozu et al. | 701/79 |
| 6,089,680 A | * | 6/2000 | Yoshioka et al. | 303/146 |
| 6,092,882 A | * | 6/2000 | Matsuno | 303/146 |
| 6,101,434 A | * | 8/2000 | Iric et al. | 701/36 |
| 6,184,048 B1 | * | 2/2001 | Ramon | 324/522 |
| 6,253,115 B1 | * | 6/2001 | Martin et al. | 700/97 |

OTHER PUBLICATIONS

IBM technical disclosure bulletin, Sep. 1993; vol. 36; issue 9A; Ref No. 00188689369A199.*

* cited by examiner

*Primary Examiner*—William A. Cuchlinski, Jr.
*Assistant Examiner*—Ronnie Mancho
(74) *Attorney, Agent, or Firm*—Armstrong Teasdale LLP

(57) ABSTRACT

A method of predicting failures in equipment including at least one sensor for generating sensor data corresponding to a sensed parameter. The method includes monitoring the sensor data during normal operation of the equipment. The sensor data during normal operation is compared to a model prediction of the sensed parameter to determine variance between the sensor data and the model prediction. The model is calibrated to minimize the variance between the model prediction and the sensor data. Error in the sensor data is determined and an error condition is generated upon detection of an error in the sensor data.

8 Claims, 3 Drawing Sheets

METHOD FOR DIAGNOSIS OF EQUIPMENT

BACKGROUND OF THE INVENTION

The invention relates to a method for preventive maintenance diagnosis of equipment which utilizes a six sigma quality approach to forecast incipient failure. Equipment is expected to operate without interruption over a predetermined period of time. For example, locomotives are expected to operate without interruption for a period of typically 92 days. At the end of the 92 day period, scheduled routine shop maintenance occurs, where the opportunity exists to replace worn or damaged components which might prevent the locomotive from completing the next 92 day mission. It would be beneficial to identify equipment problems before such problems result in failures with sufficient lead time to correct deficiencies during scheduled maintenance.

Accordingly, there is a need in the art for an improved method of diagnosing equipment.

BRIEF SUMMARY OF THE INVENTION

An exemplary embodiment of the invention is directed to a method of predicting failures in equipment including at least one sensor for generating sensor data corresponding to a sensed parameter. The method includes monitoring the sensor data during normal operation of the equipment. The sensor data during normal operation is compared to a model prediction of the sensor data to determine variance between the sensor data and the model prediction. The model is calibrated to minimize the variance between the model prediction and the sensor data. Error in the sensor data is determined and an error condition is generated upon detection of an error in the sensor data.

DETAILED DESCRIPTION OF THE INVENTION

Figure 1:
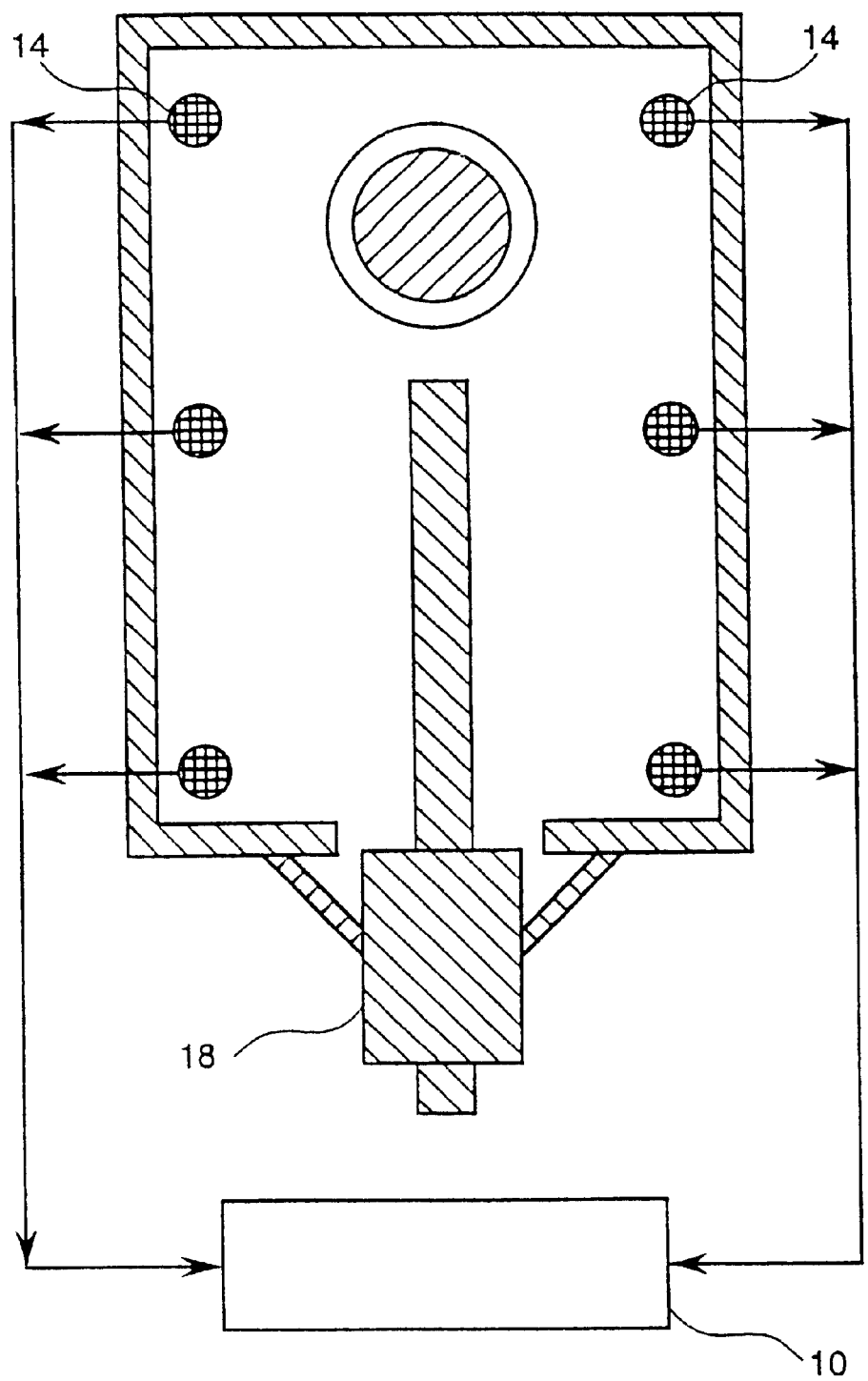
FIG. 1 depicts an exemplary system for implementing the present invention.

An exemplary embodiment of the present invention is a method of applying six sigma methodology to the diagnosis of equipment to forecast incipient failures. FIG. 1 depicts a system in which the method of the present invention may be employed. FIG. 1 shows a piece of equipment 18 fitted with a plurality of sensors 14. In an exemplary embodiment, equipment 18 is a diesel engine in a locomotive. Sensors 14 can be any of a variety of devices dependent on the particular parameter to be sensed. For example, sensors 14 may be temperature sensors such as thermocouples or resistance temperature detectors. Sensors 14 may also include vibration, speed or pressure sensors. The sensors 14 produce sensor data, corresponding to a sensed parameter, which is provided to control system 10. The sensor data may correspond to a variety of parameters including parameters such as coolant temperature (inlet and outlet), oil temperature (inlet and outlet), air temperature (inlet and outlet), fuel flow rate, air pressure differential (e.g. across filters) or revolutions per minute (RPM). Control system 10 monitors the sensor data, compares the sensor data to model predictions and generates an alarm in the event a fault condition is detected.

Figure 2:
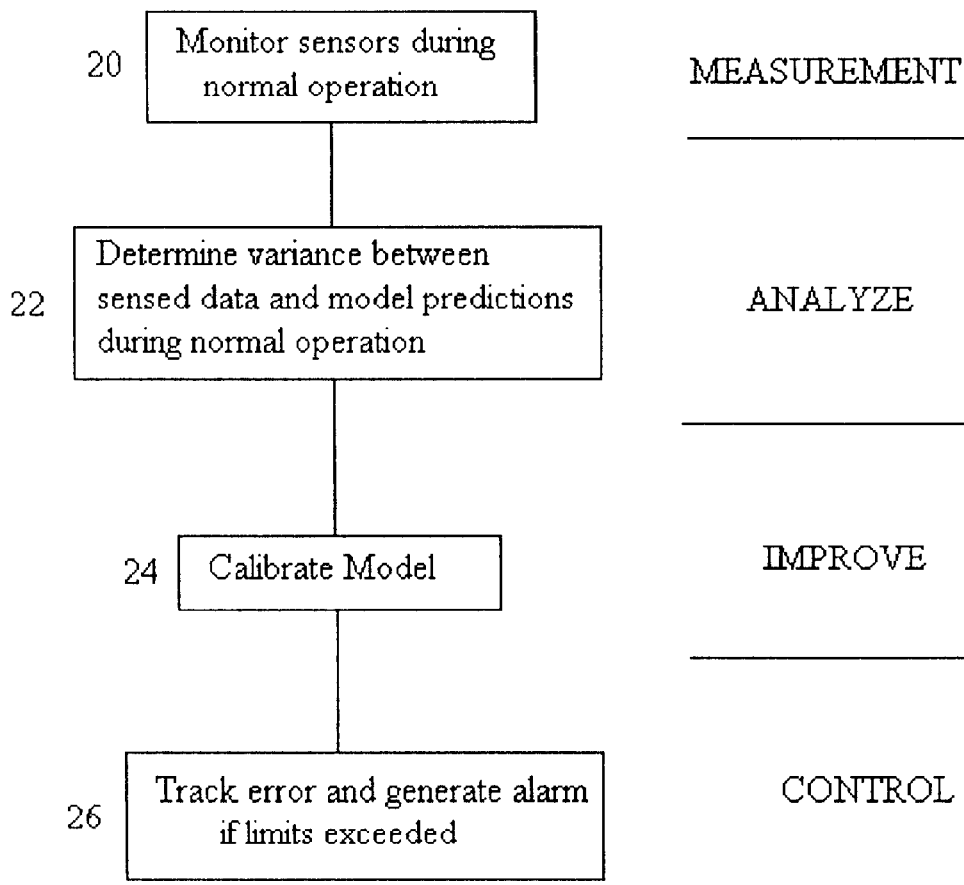
FIG. 2 is a flowchart of a series of method steps in accordance with the present invention.

An exemplary embodiment of the invention uses a six sigma approach to establish the model predictions and compare the sensor data to the model predictions. The process may be performed in four phases, namely a measurement phase, analysis phase, improvement phase, and control phase. FIG. 2 is a flow chart depicting the overall process of diagnosing equipment in an exemplary embodiment of the invention. The first phase of the process is the measurement phase and includes step 20. At step 20, equipment sensors 14 are monitored during normal operation to benchmark sensor accuracy and determine sensor repeatability and reliability. In order to accurately determine error conditions, the variance of the sensors under normal operating conditions is determined. For example, if a temperature sensor has a variance of +/−5° F., then there is no need to generate an error condition if the temperature sensor exhibits changes within this range.

Once the sensor performance under normal operating conditions is determined, the process enters the analyze phase. At step 22, a performance model of the equipment is used to determine the variance between sensor data and model predictions when the equipment is operating normally. In the locomotive engine example, the performance model may be a thermal performance model which simulates thermal streams (e.g., coolant, air, oil) in the engine. Predicted temperature values generated by the performance model are compared to sensed temperature data generated by sensors 14 and variance between the sensor data and the model predictions is determined.

In the improve phase, at step 24 the performance model is calibrated to minimize variance between the sensor data and the model predictions during normal operating conditions. In addition, tolerance levels are set for each sensed parameter. The tolerance levels are established based on variations in the sensor data for a particular sensed parameter (e.g., coolant inlet temperature) during normal operating conditions. The tolerance levels are useful in establishing error limits and in detecting the presence of an error as described below.

Figure 3:
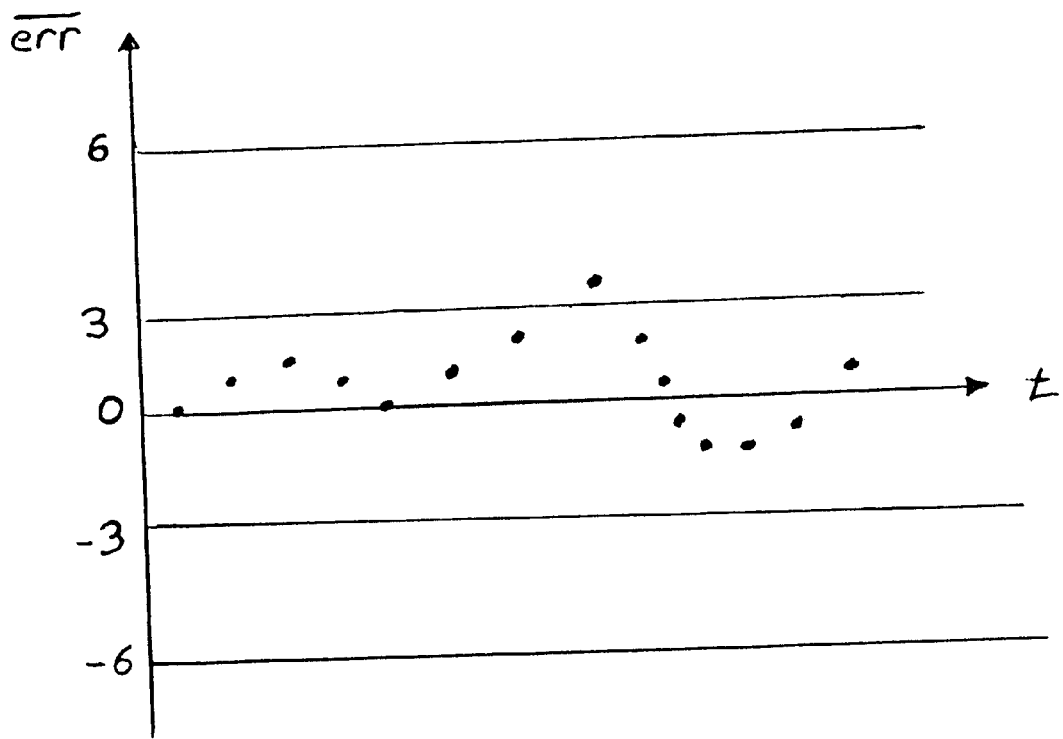
FIG. 3 depicts a chart of average normalized error versus time.

In the control phase, the process tracks error in the sensor data and generates an alarm if necessary at step 26. In the control phase, the average normalized error is compared to limits as shown in FIG. 3. FIG. 3 is a graph of average normalized error $\overline{err}$ versus time t (often referred to as a control chart). The average normalized error is compared to limits such as +/−3 or +/−6 as shown in FIG. 3. The normalized error is computed for each sensed parameter and the average normalized error for each sensed parameter is compared to limits as shown in FIG. 3. The normalized error is derived from the sensor data minus the model predicted value divided by the standard deviation of the error as shown below.

$$err = \frac{x_{sensed} - x_{predicted}}{\sigma_{error}}$$

This gives a numerical value indicating how many standard deviations (or sigma) the error is from a nominal error. The nominal error should be zero as shown in FIG. 3. The normalized error err is averaged over a period of time to derive the average normalized error $\overline{err}$ shown in FIG. 3.

Limits may be set for each sensed parameter or groups of sensed parameters. FIG. 3 shows two sets of limits +/−3 and +/−6. If the average normalized error for the sensor data is more than 3 standard deviations away from the nominal error, it will exceed the +/−3 limit. A limit may be set for a higher value, such as six standard deviations or six sigma. In this scenario, the average normalized error for a sensed parameter may deviate up to six standard deviations from the nominal error before exceeding a limit. A higher limit would be appropriate for sensor data that has a large variance during normal operating conditions. A lower limit would be appropriate for sensed parameters that have a low variance during normal operating conditions.

Generation of an error condition or alarm may be based on a variety of analysis techniques. For example, if the average normalized error exceeds a limit, an error condition may be generated. Alternatively, an error condition may be generated if the average normalized error exceeds a limit for a predetermined time (e.g., three consecutive data points exceeding the limit). Other techniques known in the art for detecting abnormality in the average normalized error (e.g. slope analysis) may be used. The error condition may have several levels of importance. For example, a low level error condition may indicate that service of a particular component is necessary at the next scheduled maintenance. A medium level error condition may indicate that service is needed within a predetermined time (e.g. 24 hours). A high level error condition may indicate that the equipment should be shut down immediately.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A six sigma method of predicting failures in locomotive equipment including at least one sensor for generating sensor data corresponding to a sensed parameter, the method comprising:

monitoring the sensor data during normal operation of the equipment;

comparing the sensor data during normal operation to a model prediction of the sensed parameter to determine variance between the sensor data and the model prediction;

calibrating the model to facilitate minimizing the variance between the calibrated model prediction and the sensor data;

generating an alarm if the sensor data exceeds a predetermined limit based on the calibrated model prediction; and predicting failures in the locomotive equipment based on the generated alarm.

2. The method of claim 1 further comprising:

establishing tolerance levels for the sensor data.

3. The method of claim 1 wherein:

said determining error includes determining a normalized error in the sensor data and generating the error condition in response to the normalized error.

4. The method of claim 3 wherein:

said determining error includes comparing the normalized error to a predetermined limit.

5. The method of claim 4 wherein:

the predetermined limit is based on variance of the sensor data during normal operation of the equipment.

6. The method of claim 1 wherein:

the sensor data includes a plurality of sensor data corresponding to a plurality of sensed parameters.

7. The method of claim 6 wherein:

the predetermined limit includes a plurality of predetermined limits, each predetermined limit corresponding to a respective sensor data.

8. The method of claim 1 wherein:

the error condition includes a plurality of error conditions indicating differing levels of failure in the equipment.

* * * * *